July 28, 1953  W. B. ELMER  2,647,202
LUMINAIRE FOR STREET LIGHTING
Filed March 24, 1950  5 Sheets-Sheet 1

Inventor:
William B. Elmer,
by Heard Smith & Tennant
Attorneys

July 28, 1953 W. B. ELMER 2,647,202
LUMINAIRE FOR STREET LIGHTING
Filed March 24, 1950 5 Sheets-Sheet 2
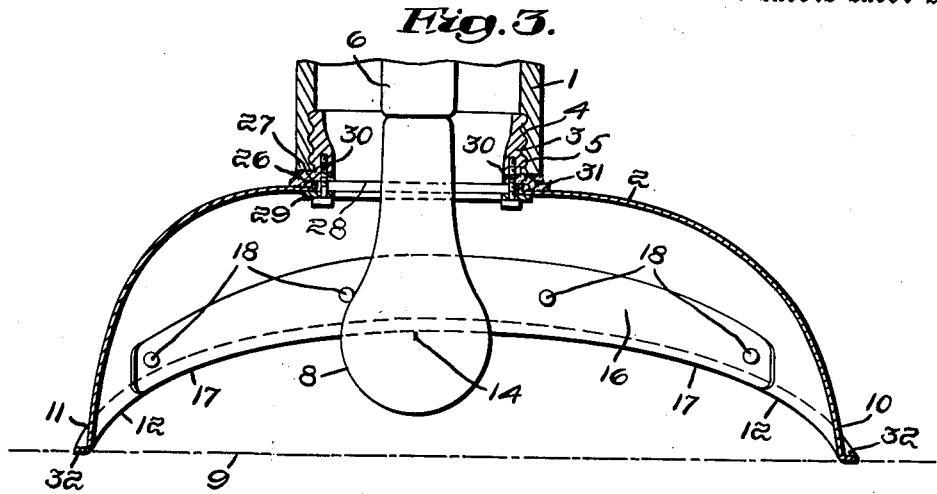
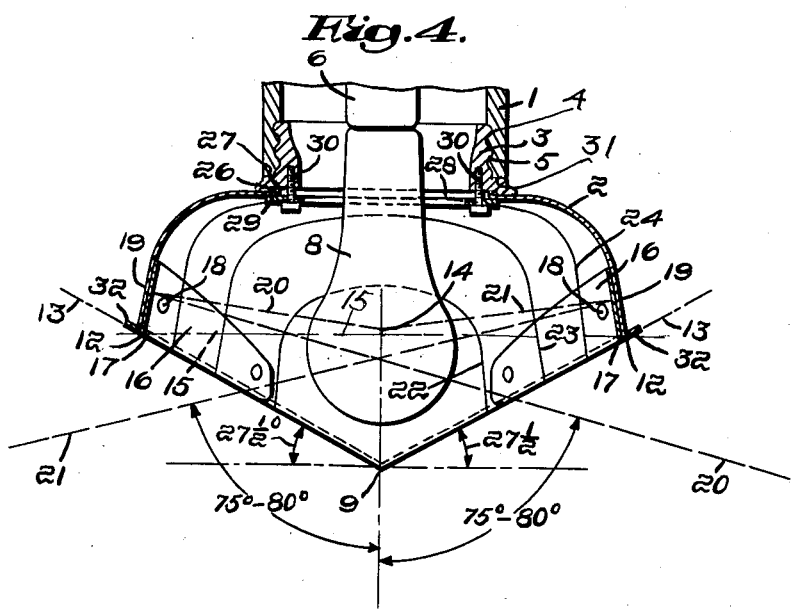
Inventor:
William B. Elmer,
by Heard Smith Tennant
Attorneys July 28, 1953 W. B. ELMER 2,647,202
LUMINAIRE FOR STREET LIGHTING
Filed March 24, 1950 5 Sheets-Sheet 3

Inventor:
William B. Elmer,
by Heard Smith & Tennant
Attorneys

July 28, 1953  W. B. ELMER  2,647,202
LUMINAIRE FOR STREET LIGHTING

Filed March 24, 1950  5 Sheets-Sheet 4

Inventor:
William B. Elmer,
by Heard Smith Tennant
Attorneys

July 28, 1953 W. B. ELMER 2,647,202
LUMINAIRE FOR STREET LIGHTING
Filed March 24, 1950 5 Sheets-Sheet 5

Inventor:
William B. Elmer,
by Heard Smith & Tennant
Attorneys

Patented July 28, 1953

2,647,202

UNITED STATES PATENT OFFICE 2,647,202

LUMINAIRE FOR STREET LIGHTING

William B. Elmer, Boston, Mass.

Application March 24, 1950, Serial No. 151,652

5 Claims. (Cl. 240—25)

1

This invention relates to a luminaire for street lighting and especially to the reflector element thereof.

One of the objects of the present invention is to provide an improved reflector for a street lighting fixture that will illuminate an increased area of the street surface in the direction of its length, while at the same time shielding from direct illumination the dwelling houses or other buildings on both sides of the street.

Another object of the invention is to provide an improved reflector which not only illuminates an increased length of the street but which also provides a more even distribution of light throughout the illuminated area than is possible with reflectors now commonly used.

A further object of the invention is to provide a reflector which while completely shielding the buildings on the side of the street from direct illumination, yet produces only a limited shielding effect in the lengthwise direction of the street so that the lighted lamp of any street lighting fixture will be visible at a considerable distance to persons driving vehicles along the street.

A reflector embodying this invention is of the asymmetrical type which has to be properly oriented to be most effective, and another object of the invention is to provide novel means by which the reflector can be properly oriented by adjusting it angularly about a vertical axis without altering the center of the reflector in a vertical direction relative to the lamp.

A still further object of the invention is to provide a novel reflector for a street lighting fixture having the above features which is so constructed that it can be equipped at low cost with either enclosing lens or with refractors to give a predetermined form of light distribution.

In order to give an understanding of the invention, I have illustrated herein one selected form thereof which will now be described, after which the novel features will be pointed out in the appended claims.

In the drawings,

Fig. 3 is a longitudinal section on the line 3—3, Fig. 2.

Fig. 4 is a transverse section on the line 4—4, Fig. 1.

2

Figure 7:
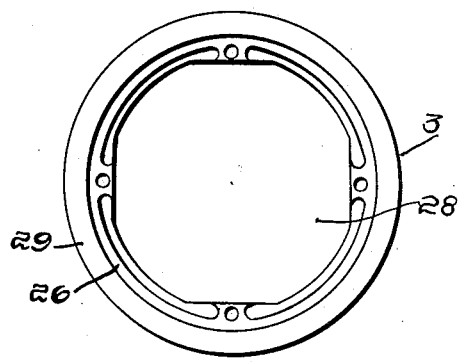

Fig. 7 is an under side view of the collar or neck with which the reflector is equipped and by which it is secured to the supporting head of the fixture.

Figure 8:
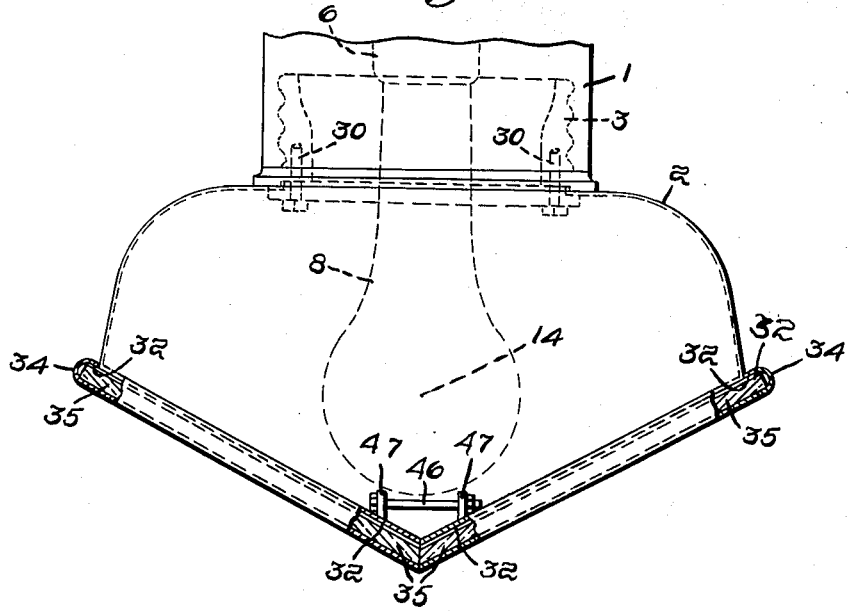

Fig. 8 is an end view of the reflector showing lenses closing the open face of the reflector and enclosing the lamp.

Figure 9:
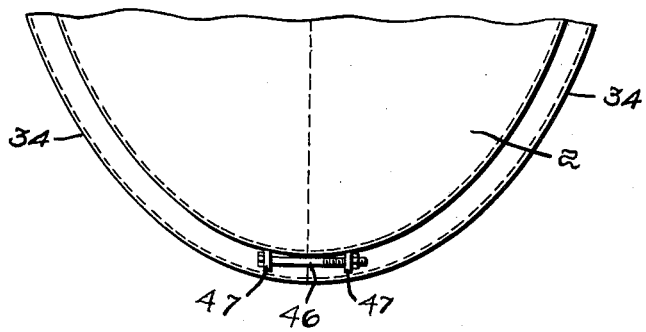

Fig. 9 is a fragmentary plan view showing a detail of the means for holding the lenses in place.

Figure 10:
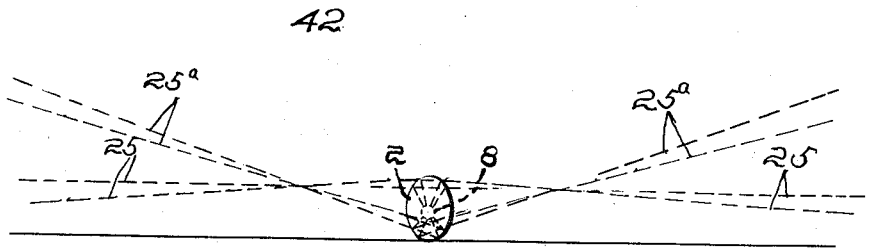

Fig. 10 is a diagrammatic view illustrating the manner in which my improved reflector functions to illuminate the street.

Figure 11:
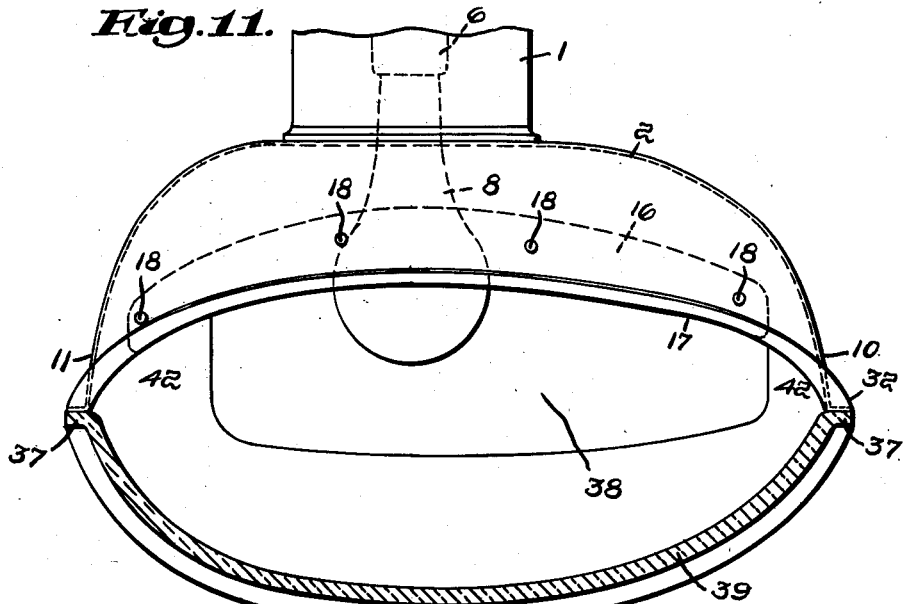

Fig. 11 is a side view of a reflector embodying my invention with its open face closed by concavo-convex transparent members, one of said members being shown in section.

Figure 12:
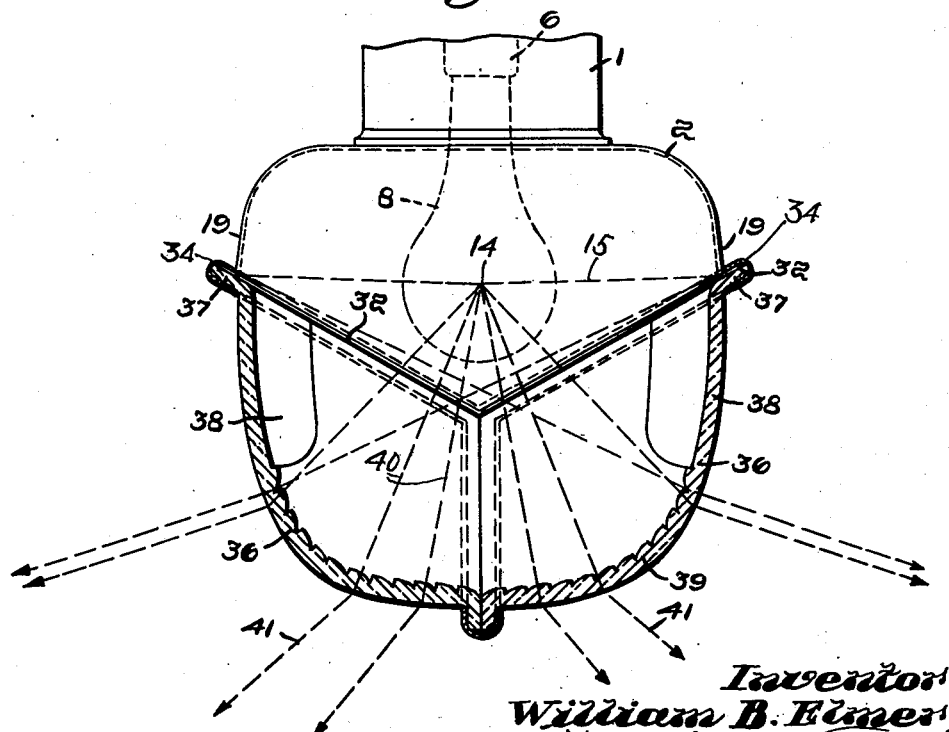

Fig. 12 is an end view of the reflector equipped with concavo-convex light-enclosing members, the latter being shown in section.

Inasmuch as the present invention relates to the reflector element of a street lighting fixture, there is shown in the drawings only so much of the supporting head of such a fixture as is necessary to give an understanding of the invention.

In the drawings 1 indicates the reflector-carrying portion of the supporting head of a street lighting fixture, 2 indicates the reflector embodying my invention, and 3 is a neck or collar secured to the reflector and by which it is supported from the reflector-supporting portion 1 of the fixture.

Said reflector-supporting portion is shown as a cylindrical element having interior screw threads 4 adapted to receive exterior screw threads 5 with which the collar or neck 3 is provided, the mounting of the reflector on the head of the fixture thus involving simply the operation of screwing the collar 3 into the portion 1 of the fixture. The head of the fixture also is provided with the usual lamp socket element 6 adapted to receive the screw threaded base 7 of the lamp 8.

The reflector 2, which is of the asymmetrical type, has a general semi-ovoid shape with the long axis indicated by the line 9 extending in a horizontal direction.

Figure 1:
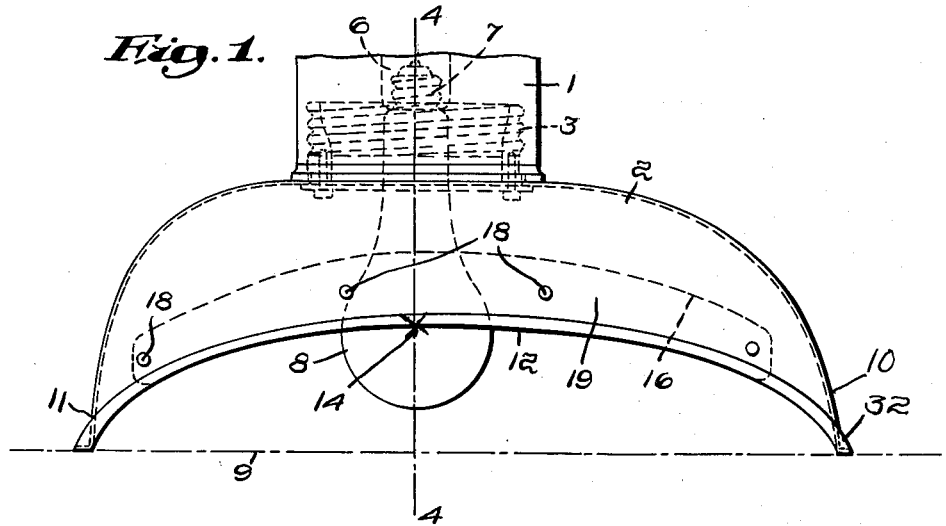
Fig. 1 is a side view of a reflector embodying my invention.

When seen in side view as shown in Fig. 1, the reflector presents a crescent shape with the horns 10, 11 of the crescent pointing downwardly.

Figure 2:
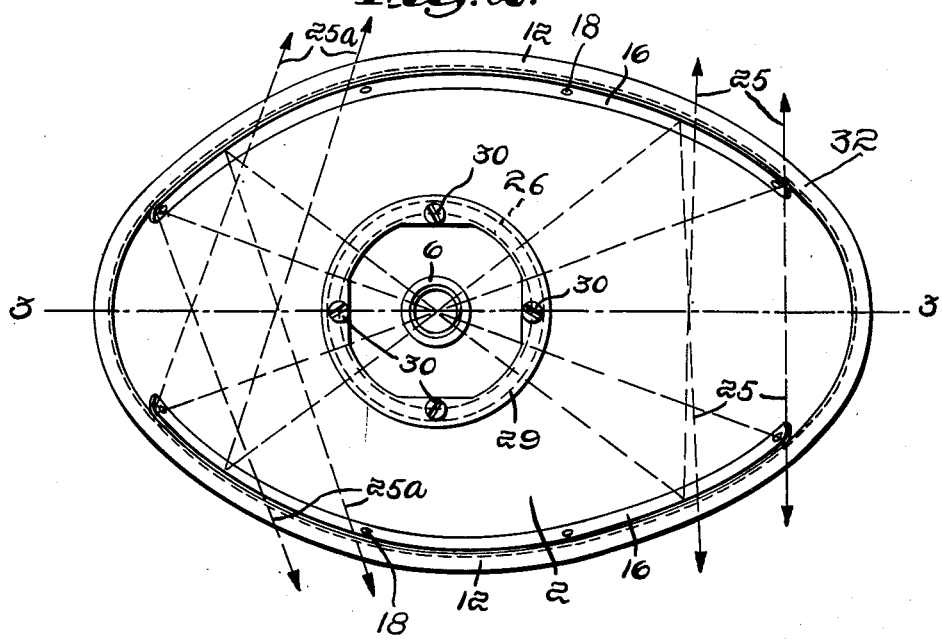
Fig. 2 is an under side view thereof.

When seen from beneath, the reflector has a general oval shape illustrated best in Fig. 2.

The shape of the reflector is such that each side edge 12 extending from one end to the other of the longitudinal axis 9 lies in a plane which contains said longitudinal axis 9 and extends outwardly and upwardly from said axis as indicated by the line 13 in Fig. 4. In other words, the two side edges 12 of the reflector are in two planes indicated by the two lines 13 which intersect each other at the longitudinal axis 9 and each of which, as stated above, inclines outwardly and upwardly from said axis. The reflector might be considered as constituted by that portion of an ovoid or egg-shaped shell arranged with its major axis extending horizontally that is included above two planes which intersect along the line of said major axis and each of which extends upwardly and outwardly from said axis. Each edge 12, therefore, has a concave curvature in its plane, and because of the inclination of the plane the ends of each edge will be at a lower level than the central portion thereof.

While the upward inclination of the planes 13 may be varied more or less without departing from the invention, yet the reflector in which the two planes 13 have an angle of approximately 27½° with the horizontal will give excellent results. This manner of forming the reflector produces the crescent shape shown in Fig. 1.

The lamp 8 is so mounted in the fixture that the light center 14 thereof is approximately in a transversely extending diametrical line 15 extending from one side edge to the other at approximately the high point of the curved edges 12 as seen in Figs. 1, 3, and 4.

The reflector body is preferably constructed of porcelain enameled steel which provides a fairly good, but diffusing, reflecting surface, and to increase the amount of illumination on the street surface I propose to equip the reflector body at each side adjacent its lower edge with specular reflecting strips 16 which have a high degree of reflectivity and which have a length somewhat less than that of the reflector body. These strips are located at the lower edge of the reflector body with the lower edge 17 of each strip coinciding with the corresponding lower edge 12 of the reflector body. These strips may be secured to the reflector body in any suitable way as by means of fastening elements 18 such as eyelets or machine screws.

While the specular reflecting strips 16 may be made of any suitable material, they will preferably be made of a corrosion-resisting material such for instance as stainless steel which is plated with chromium or rhodium or some other suitable material which will produce a corrosion-resisting reflecting surface of high reflectivity. A reflecting strip of this character has the advantage that it is not affected by exposure to the atmosphere under any condition and will, therefore, be equally effective at all times.

Each of the two elongated surfaces 19 of the reflector body to which the reflector strips are attached has a generally parabolic shape in a horizontal direction except that the curvature is slightly more acute than that of a true parabola so that the rays of light reflected by the reflector strips will converge slightly in a horizontal plane as shown by the arrows 25, 25a in Fig. 2. Said surfaces 19, as well as the reflecting strips 16 that are attached thereto, are preferably straight in a vertical direction, and as a result the beam of light reflected from the reflecting strips will diverge slightly in a vertical direction.

Figure 5:
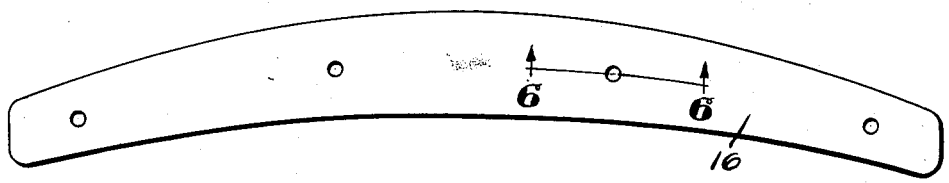
Fig. 5 is a view of one of the reflector strips which is used on the interior of the reflector.

These reflecting strips 16 are preferably made of resilient material and are normally flat, each strip having substantially the outline shown in Fig. 5. Because of their resilient characteristic each strip can be easily bent in the direction of its length to conform to the longitudinal curvature of the reflector surface 19 to which it is attached and when installed in the reflector, its shape is determined by the shape of the portion 19 of the reflector body.

The interior reflecting surface of each side portion of the reflector, that is, the portion extending from one end to the other of the specular reflecting strip 16, comprises the lower specular reflecting surface provided by said strip and the uper diffusing reflecting surface provided by the portion of the reflector above said specular reflecting strip. The specular reflecting surface is curved in the direction of its length, but is straight or flat in the direction of its width, that is, in its vertical direction. The diffusing reflecting surface above the specular reflecting surface is curved both in the direction of its length and in a vertical direction.

The interior reflecting surface at each end portion of the reflector is solely a diffusing reflecting surface which directs reflected light obliquely across the street.

The reflecting strips 16 follow the curvature of the edges 12 of the reflector and the vertical slope of each strip is such that the direct light which is intercepted thereby is redirected in a light beam which passes underneath the opposite curved edge 12 of the reflector and is directed onto the road surface at an angle of approximately 75° to 80° from the vertical, as indicated by the dotted lines 20, 21 in Fig. 4. Since each reflecting strip 16 is straight or flat in an edge-to-edge or vertical direction, the beam of light reflected therefrom will diverge somewhat in a vertical direction, thus increasing the area of the road surface in its lengthwise direction which is illuminated by said beam. The illumination furnished by the light beam reflected from each specular strip 16 is further enhanced by the fact that the specular character of said strip enables it to reflect practically all of the light rays intercepted thereby.

Figure 6:
Fig. 6 is a section on the line 6—6, Fig. 5.

These reflecting strips 16 are also preferably provided with very shallow corrugations extending vertically from one longitudinal edge to the other as shown at 38 in Fig. 6. Such corrugations result in a slight horizontal spreading of the reflected rays with the result that when the luminaire is viewed from the street, the entire reflecting surface of the strip appears to be luminous from one end to the other, thus avoiding a condition in which the reflected light appears to emerge from a restricted portion of the strip.

In Fig. 4 the lines 22, 23, 24 indicate the vertical slopes of the reflecting area through several vertical contours and from these it will be seen that the reflecting surfaces are steepest through the contour indicated by the line 22 which shows the curvatures of the reflector adjacent either end just beyond the ends of the specular strips.

The fixture is so mounted on the supporting pole that the longitudinal axis extends transversely to the street and the end portions 10 and 11, which constitute the horns of the crescent shape, extend well below the light center as shown in Fig. 1 and provide the desired deep shielding of the buildings either side of the street from direct illumination.

The fact that each of the reflecting strips 16 reflect the light rays at the angle of substantially 75° to 80° from a vertical and produce a reflected beam that diverges slightly in a vertical direction provides excellent illumination of the road surface at a considerable distance from the light. Experiments which have been made indicate that with this type of reflector the illumination of the roadway surface in a region which is at a distance from the lamp equal to three to five times the height of the lamp from the roadway is approximately five times greater than the illumination that would be afforded by a bare lamp. The roadway directly beneath the reflector is, of course, well illuminated, but the strengthened illumination of the roadway which this reflector gives at a considerable distance from the lamp is an important feature because of the improved visibility provided under traffic conditions.

The reflector is so mounted on its supporting member 1 that the lamp center is slightly offset from the center of the reflector in the direction of its longitudinal axis as best seen in Figs. 1 and 3. Street lighting fixtures are commonly placed at the side of the street, and in mounting my improved reflector, it should not only be placed with the longitudinal axis extending transversely of the street, but with the light center nearest to the end of the reflector which is furthest from the center of the street. With this offset arrangement the outer end portion of each reflector strip, that is the end nearest the center of the street, will reflect the light rays in the general direction of the length of the street as indicated by the lines of reflection 25, Fig. 2 while the inner end portion of each reflector strip, that is the end furthest from the center of the street, will reflect the light rays at an angle to the length of the street as shown by the lines of reflection 25a. These reflected rays 25 and 25a cross each other and diverge beyond the crossing, thereby illuminating the entire width of the street, as illustrated in Fig. 10 in which the street is indicated at 42.

Since the light center 14 is substantially in the horizontal transverse diametrical line 15, the side edges 12 will afford very little shielding of the light in a direction lengthwise of the street and hence the driver of a vehicle approaching the street lighting fixture will be able to see the light from a considerable distance. In other words the street lights function as beacons at night which indicate to persons traveling along the street the direction thereof at some distance ahead.

It will be apparent from the above that in order to function properly the reflector must be correctly placed with relation to the lengthwise direction of the street, and to facilitate the installation of the reflector and its orientation after installation, the supporting neck 3 for the reflector is in the nature of a floating neck which is adjustably secured to the reflector body in a novel way.

The neck 3 is provided on its under face with an annular groove 26 which receives an upturned lip 27 surrounding the lamp-receiving opening 28 of the reflector. The reflector is clamped to the neck 3 by means of a clamping ring 29 which is connected to the neck by means of attaching screws 30. The groove 26 is preferably somewhat wider than the thickness of the up-turned lip 27 and also somewhat deeper than the height of said lip, so that if in the process of providing the reflector body with its enamel coating a bead of enamel forms on the edge of the lip, there will be plenty of space in the groove to receive said bead and the latter will not be subjected to any crushing action by the clamping pressure of the clamping ring which might result in exposing the edge of the metal base of the reflector to the action of the weather.

In installing the reflector the neck 3 will be screwed into the reflector supporting member 1 until the shoulder 31 of the neck is brought up against the lower edge of the member 1. Thereafter the attaching screws 30 may be loosened sufficiently to permit the reflector to be turned about a vertical axis, and when the screws have been thus loosened, the reflector is oriented by turning it about its axis until it is positioned to function properly and thereafter the clamping screws are tightened to clamp the reflector in place.

This operation of orienting the reflector is accomplished without changing the vertical position of the reflector and therefore without altering the position of the reflector vertically relative to the light center of the lamp.

The reflector is made with an outwardly extending lip 32 at its lower edge, which lip occupies the plane indicated by the lines 13 in Fig. 4. This lip provides means for attaching to the under side of the reflector either plain lenses for the purpose of enclosing the lamp, or refracting elements which may be used to give some special light distribution. Such lenses or refracting elements may be flat elements 35 lying flatly against the flanges 32 and occupying the planes indicated by the lines 13 as shown in Fig. 8, or they may have a concavo-convex shape shown in Figs. 11 and 12.

Referring to Figs. 8 and 9, the flat transparent elements are retained in position by U-shaped supporting members 34 that embrace the flanges 32 and the edges of the elements 35.

I will preferably use two supporting members 34, one for each side of the reflector, each supporting member extending from one end to the other of the longitudinal diametrical line 9. Each supporting member thus embraces the flange 32 and the outer edge portion of the lens or refracting member 35 on one side of the reflector. The inner edge portion of the two members 35 meet along the diametrical line 9.

I will preferably provide means for tying together the ends of the supporting members 34 so as to insure that they will not become displaced. For this purpose each supporting member 34 has at each end thereof an upstanding ear 47 and the two ears at each end of the reflector are tied together by a suitable tie rod 46. With this construction the lenses 35 can be easily installed on a reflector body or removed therefrom.

In Figs. 11 and 12 the transparent members enclosing the light 8 are indicated at 36 and they are concavo-convex in shape. Each member 36 is formed with an edge flange 37 which fits against the flange 32 of the reflector, and said members are secured to the flanges 32 by the U-shaped supporting members 34 as described with reference to the construction shown in Figs. 8 and 9.

The members 36 may have any desired construction depending on the requirements for distribution of the light. In Fig. 11 each member 36 has a plain portion 38 situated at its upper edge through which the rays reflected by the specular reflecting strips 16 pass, and a light-refracting portion 39 which receives the downwardly directed direct rays 40 from the lamp 8 and refracts them in the general direction of the length of the street as indicated by the lines 41.

The direct rays from the lamp 8 which pass through the plain portion 38 add to the lighting effect produced by the light reflected by the reflecting strips 16.

The end portions 42 of the light-refracting part of the members 36 may be made so as to refract the direct rays from the lamp 8 in the general direction of the length of the street.

The members 36 have no appreciable effect on the light reflected from the reflecting strips, but they are effective in making use of the direct downwardly directed rays 40 for increasing the illumination of the street surface at a distance from the light fixture provided by the reflecting strips.

The flat enclosing members 35 may be made either of glass or of some suitable transparent plastic material. The angle which these plates make with the horizontal (approximately 27½°) is such that they are well protected from the weather and also from the effects of wind blown dust. Because of this plastic material will be suitable for the flat plates. The angular position of the flanges 32 is such that they function as gutters to catch the water draining off from the sides of the reflector.

The elongated shape of the reflecting strips 16 herein shown have the further advantage that they produce a rather broad reflection on wet pavements instead of a sharp line of reflected light such as is produced by most small street lighting fixtures and which is distracting to operators of motor vehicles when driving at night.

I claim:

1. A street lighting fixture comprising a one-piece reflector having a general ovoid shape, means supporting said reflector with its major axis extending horizontally, the entire length of each side of said reflector from one end to the other of its major axis being in a plane which contains said axis and inclines upwardly and outwardly therefrom and thereby provides an edge to which a flat light-transmitting plate can be secured and giving to said reflector a crescent shape when viewed from the side, a light unit, means supporting said light unit with its light center in a transverse diametrical line connecting the highest points in the curvature of each side edge, the inner surface of the reflector throughout a narrow elongated zone adjacent each side edge having a specular character and being straight in a direction perpendicular to the longitudinal top and bottom edges of said zone, the vertical slope of the reflector throughout each elongated zone being inclined to the vertical at an angle to reflect a beam of light from the light unit in the general direction of said transverse diametrical line but downwardly at an angle of approximately 75° to 80° from the vertical, the flat or straight characteristic of each specular zone in a vertical direction producing a light beam which diverges slightly in a vertical direction.

2. A street lighting fixture as defined in claim 1, in which the curvature of the reflector in each specular zone from one end to the other thereof is slightly more acute than that of a true parabola so that the light beam reflected from each specular zone converges slightly in a horizontal plane.

3. A street lighting fixture as defined in claim 1, in which the specular zone is provided for by elongated specular reflecting strips attached to the inside face at each side of the reflector along the side edge thereof, each specular reflecting strip being flat or straight in a direction from its top to its bottom edge and having a curvature in a lengthwise direction slightly more acute than that of a true parabola, whereby the light beam reflected from each specular reflecting strip diverges slightly in a vertical direction and converges slightly in a horizontal direction.

4. A reflector for street lighting fixture, said reflector being constituted by that portion of an ovoid shell formed by cutting said shell by two intercepting planes which form between them an angle no less than 110°, the line of intersection of which planes coincides with the major or longer axis of the ovoid shell, whereby the entire length of each side edge of the reflector from one end to the other of said major axis lies in one of said planes and has a downwardly and inwardly concave curvature, the lower marginal inner surface of said reflector along each curved side edge having a mirror-like reflecting characteristic and the remaining portion of the inner surface having a diffusing reflecting surface, means supporting said reflector with its major axis extending horizontally and transversely of the street to be illuminated and with the plane of each side edge having the same angle with the horizontal, a light unit, and means supporting said unit with its light center approximately in a transverse line extending from the high point of one side edge to that of the other, whereby said lighting unit is visible to a traveler on the street at a distant point and thus constitutes a beacon to indicate to the traveler the direction of the street at such distant point, the portion of the reflector at each side having the mirror-like reflecting characteristic being inclined to the vertical at an angle to reflect a beam of light lengthwise of the street at an angle of approximately 75° to 80°, and also being flat in a transverse direction whereby said beam will diverge slightly in a vertical direction.

5. A reflector for street lighting fixture as defined in claim 4 in which the planes of the two side edges of the reflector form between them an angle between 110° and 140°.

WILLIAM B. ELMER.

References Cited in the file of this patent

UNITED STATES PATENTS

| Number | Name | Date |
|---|---|---|
| D. 149,972 | Rex | June 15, 1948 |
| 1,551,274 | Townsend | Aug. 25, 1925 |
| 1,707,038 | Bauersfeld | Mar. 26, 1929 |
| 1,897,364 | Dietz | Feb. 14, 1933 |
| 2,122,295 | Rolph et al. | June 28, 1938 |
| 2,142,458 | Rusch | Jan. 3, 1939 |
| 2,327,186 | Halvorson | Aug. 17, 1943 |
| 2,330,924 | Rolph | Oct. 5, 1943 |
| 2,578,451 | Rex | Dec. 11, 1951 |